(12) United States Patent
Itoh et al.

(10) Patent No.: US 7,520,320 B2
(45) Date of Patent: Apr. 21, 2009

(54) AUTOMOTIVE AIR CONDITIONING SYSTEM

(75) Inventors: Satoshi Itoh, Kariya (JP); Yoshitaka Tomatsu, Chiryu (JP); Yasutaka Kuroda, Anjo (JP)

(73) Assignee: Denso Corporation, Kariya (JP)

( * ) Notice: Subject to any disclaimer, the term of this patent is extended or adjusted under 35 U.S.C. 154(b) by 711 days.

(21) Appl. No.: 11/059,608

(22) Filed: Feb. 16, 2005

(65) Prior Publication Data

US 2005/0178523 A1    Aug. 18, 2005

(30) Foreign Application Priority Data

Feb. 18, 2004   (JP)   ............... 2004-041162
Nov. 25, 2004   (JP)   ............... 2004-340405

(51) Int. Cl.
*B60H 1/00* (2006.01)
*F25B 47/02* (2006.01)
*F25B 29/00* (2006.01)

(52) U.S. Cl. .................. 165/202; 165/42; 165/43; 165/240; 165/241; 165/242; 237/2 A; 237/2 B; 237/12.3 B; 62/434; 62/435; 62/201; 62/238.6; 62/238.7; 62/160

(58) Field of Classification Search .............. 165/202, 165/42, 43, 240, 241, 242; 237/2 A, 2 B, 237/12.3 B; 62/434, 435, 201, 238.6, 238.7, 62/160

See application file for complete search history.

(56) References Cited

U.S. PATENT DOCUMENTS 5,291,960 A * 3/1994 Brandenburg et al. ...... 180/65.2
5,549,153 A * 8/1996 Baruschke et al. ............ 165/42
5,641,016 A * 6/1997 Isaji et al. ...................... 165/43
6,047,770 A * 4/2000 Suzuki et al. ................ 165/202
6,454,180 B2 * 9/2002 Matsunaga et al. ....... 237/12.38
6,913,067 B2 * 7/2005 Hesse .......................... 165/43
6,935,421 B2 * 8/2005 Takeuchi et al. ............ 165/202
7,048,044 B2 * 5/2006 Ban et al. .................... 165/202
7,055,590 B2 * 6/2006 Hara .......................... 165/202
2004/0134217 A1   7/2004 Itoh et al.

FOREIGN PATENT DOCUMENTS

JP        11-208250        8/1999
JP        2004-218853      8/2004

* cited by examiner

*Primary Examiner*—John K Ford
(74) *Attorney, Agent, or Firm*—Harness Dickey & Pierce, PLC

(57) ABSTRACT

An automotive air conditioning system has a primary hot water circuit 11 located on a side where a vehicle installed heat generator 10 is located and a secondary hot water circuit 13 which includes a hot water type heater core 12 for heating passenger compartment outlet air, whereby when in a heating mode, in the event that a coolant temperature TW1 of the primary hot water circuit is lower than a coolant temperature TW2 of the secondary hot water circuit 13, an opening and closing valve 26 is closed, whereas an opening and closing valve 23 is opened, so that a state is created in which the hot water circuits 11, 13 are separated from each other. On the other hand, in the event that the coolant temperature TW1 of the primary hot water circuit becomes higher than the coolant temperature TW2 of the secondary hot water circuit 13, the opening and closing valve 26 is opened, whereas the opening and closing valve 23 is closed, so that a state is created in which the hot water circuits 11, 13 are connected to each other.

10 Claims, 7 Drawing Sheets

AUTOMOTIVE AIR CONDITIONING SYSTEM

BACKGROUND OF THE INVENTION

1. Field of the Invention

The present invention relates to an automotive air conditioning system having a hot water type heater core for heating air using hot water as a heat source and a coolant-refrigerant heat exchanger for heating hot water using a refrigerant discharged from a compressor in a refrigeration cycle as a heat source, and more specifically to an automotive air conditioning system which is effective when applied to vehicles having a fuel cell installed therein, electric vehicles or hybrid vehicles in which less waste heat is generated from the engine installed therein.

2. Description of the Related Art

Japanese Unexamined Patent Publication No. 11-208250 discloses a hot water circuit configuration for a conventional automotive air conditioning system having a hot water type heater core for heating air using hot water (coolant) from an engine installed in a vehicle as a heat source, which hot water circuit configuration increases the heating performance inside a passenger compartment before the engine has warmed up.

In this related art, a bypass pipe is provided to connect a hot water inlet pipe to a hot water outlet pipe of the hot water type heater core, and opening and closing valves are provided at locations along the hot water inlet pipe and the hot water outlet pipe, respectively, which are closer to the engine side than the connecting portion of the bypass pipe.

Therefore, by closing the opening and closing valves, a local closed circuit is formed at a location in the vicinity of the hot water type heater core by the hot water type heater core and the bypass pipe. A hot water heater using an electric heater and an electric pump are provided in the local closed circuit.

By adopting this construction, before the engine of the vehicle has warmed up, both the opening and closing valves are closed, the electric pump is activated and the electric heater is energized, so that water inside the local closed circuit is heated by means of the electric heater. As this occurs, since the electric heater only has to heat a small amount of water within the local closed circuit, the speed at which the temperature of the water is increased increases, so that the heating performance in the passenger compartment is increased before completion of warming up of the engine of the vehicle.

In the related art, while the amount of water that is to be heated by the electric heater is limited, since the specific heat of water is very high, it takes time to heat water to a predetermined temperature by means of the electric heater, and the immediate effectiveness in heating the interior of the passenger compartment is insufficient.

SUMMARY OF THE INVENTION

The present invention was made in view of the aforesaid situations, and an object thereof is to increase the immediate effect of the heating performance in the passenger compartment.

In particular, the invention is intended to increase the immediate effectiveness of the heating performance in the passenger compartment in an automotive air conditioning system which includes in a refrigeration cycle a coolant-refrigerant heat exchanger which implements heat exchange between a coolant of a heat generator installed in a vehicle and a high-pressure refrigerant and a heat exchanger in a passenger compartment which heats outlet air into the passenger compartment with the high-pressure refrigerant and in which outlet air into the passenger compartment can also be heated by a hot water type heater core into which the coolant of the heat source is allowed to flow.

Note that the heat generator installed in the vehicle means a heat generator such as a fuel cell for generating electric power that is supplied to an automotive driving motor, a driving motor of an electric vehicle and a driving engine of a hybrid vehicle which is installed in the vehicle and is cooled by coolant.

With a view to achieving the object, according to an aspect of the invention, there is provided an automotive air conditioning system including:

A primary hot water circuit (11) which includes a heat generator (10) installed in a vehicle and through which a coolant which cools the heat generator (10) flows;

a secondary hot water circuit (13) which includes a hot water type heater core (12) which heats passenger compartment outlet air and in which the coolant flows through the hot water type heater core (12);

valve means (23, 26) adapted to be changed over between a cutting off state in which the valve devices cut off the primary hot water circuit (11) from the secondary hot water circuit (13) and a connecting state in which the valve devices connect the primary hot water circuit (11) with the secondary hot water circuit (13);

a coolant-refrigerant heat exchanger (20) provided on a discharge side of a compressor along a refrigeration cycle (R) for heating the coolant in the secondary hot water circuit (13) by virtue of heat dissipation from a high-pressure refrigerant on the discharge side of the compressor; and a primary control means (S330 to S360) for controlling the valve means (23, 26) by comparing a coolant temperature (TW1) of the primary hot water circuit (11) with a coolant temperature (TW2) of the secondary hot water circuit (13); wherein the primary control means (S330 to S360) controls such that the valve means (23, 26) are put in the cutting off state when the coolant temperature (TW1) of the primary hot water circuit (11) is lower than the coolant temperature (TW2) of the secondary hot water circuit (13), whereas when the coolant temperature (TW1) of the primary hot water circuit (11) becomes higher than the coolant temperature (TW2) of the secondary hot water circuit (13), the valve means (23, 26) are put in the connecting state.

According to this construction, in an initial stage of starting the engine where the coolant temperature on the heat generator (10) side is low, the secondary hot water circuit (13) having the hot water type heater core (12) is cut off from the primary hot water circuit (11) on the heat generator (10) side, so that only a small amount of coolant on the secondary hot water circuit (13) side is heated by the coolant-refrigerant heat exchanger (20) on the refrigeration cycle (R).

Moreover, the heating device for heating the coolant is made up of the coolant-refrigerant heat exchanger (20) on the refrigeration cycle (R), the coolant can be heated by making use of both an amount of heat which corresponds to the compression work of the compressor and an amount of heat absorbed by an outer heat exchanger (18). Due to this, the heating capability of coolant can be increased when compared with the case of the aforesaid Japanese Unexamined Patent Publication where the coolant is heated by the electric heater.

With these facts being coupled with each other, the increase in the coolant temperature on the secondary hot water circuit (13) can be promoted. As a result, a state where an air heating function by the hot water type heater core (12) can be exhibited can be created earlier, thereby making it possible to increase the heating performance immediate effectiveness in the initial stage of starting the heat generator (10) installed in the vehicle.

In the present invention, the primary control means (S330 to S360) sets as a determination temperature a predetermined low temperature at which the warming up of the heat generator (10) is necessary, whereby when the coolant temperature (TW1) of the primary hot water circuit (11) is lower than the predetermined low temperature, the valve means (23, 26) are controlled to be forcibly put in the connecting state.

According to this construction, even in the event that the coolant temperature (TW1) of the primary hot water circuit (11) is lower than the coolant temperature (TW2) of the secondary hot water circuit (13), when the coolant temperature (TW1) of the primary hot water circuit (11) on the heat generator (10) side is lower than the predetermined low temperature, the primary hot water circuit (11) and the secondary hot water circuit (13) can be brought into connection with each other in any case.

In this state where the two hot water circuits are in connection with each other, the coolant flows throughout both the hot water circuits (11, 13), and since the coolant is heated by waste heat from the heat generator (10) and heat dissipated from the high-pressure refrigerant in the coolant-refrigerant heat exchanger (20), the increase in the coolant temperature (TW1) on the heat generator (10) can be promoted so as to promote the warming up of the heat generator (10) at the time of starting it up in a low temperature condition.

In the present invention, the automotive air conditioning system includes further an inner heat exchanger (31) which is connected to a downstream side of a refrigerant flow in the coolant-refrigerant heat exchanger (20) for heating the passenger compartment outlet air by virtue of the heat dissipation from the high-pressure refrigerant when in the heating mode.

According to the construction, the passenger compartment outlet air can be directly heated by the inner heat exchanger (31) of the refrigeration cycle (R) in the heating mode while heating only the coolant on the secondary hot water circuit (13) by the coolant-refrigerant heat exchanger (20).

Here, since the thermal capacity of the inner heat exchanger (31) is much smaller than that of the coolant-refrigerant heat exchanger (20), the temperature of the inner heat exchanger (31) can be increased quickly after the start up of the refrigeration cycle (R). Due to this, the passenger compartment outlet air can be heated by the inner heat exchanger (31) immediately the refrigeration cycle is started up, thereby making it possible to increase the temperature of the passenger compartment outlet air. As a result, the heating effectiveness can further be increased in the initial stage of staring up the heat generator (10) installed in the vehicle.

In addition, since the inner heat exchanger (31) is designed to be connected to the downstream side of the refrigerant flow in the coolant-refrigerant heat exchanger 20 when in the heating mode, the inner heat exchanger (31) can be used as a refrigerant heat absorber on a low pressure side of the cycle while the coolant-refrigerant heat exchanger (20) is kept functioning as a heat exchanger on a high pressure side of the cycle.

In the present invention, the inner heat exchanger (31) is disposed on an upstream side of the hot water type heater core (12) in a passageway of passenger compartment outlet air, bypass passageways (39a, 39b) which bypass the hot water type heater core (12) and door means (40a, 40b) which open and close an air passageway of the hot water type heater core (12) and the bypass passageways (39a, 39b) are disposed in the passageway of passenger compartment outlet air, and there is provided further a secondary control means (S300 to S320) for controlling the door means (40a, 40b) by comparing an air temperature (TE) resulting after the passage through the inner heat exchanger (31) with the coolant temperature (TW2) of the secondary hot water circuit (13), whereby when in the heating mode, the secondary control means (S300 to S320) controls such that the door means (40a, 40b) are located at positions where the door devices fully close the air passageway of the hot water type heater core (12) when the air temperature (TE) resulting after the passage through the inner heat exchanger (31) is higher than the coolant temperature (TW2) of the secondary hot water circuit (13), whereas when the coolant temperature (TW2) of the secondary hot water circuit (13) is higher than the air temperature (TE) resulting after the passage through the inner heat exchanger (31), the door means (40a, 40b) are located at positions where the door devices open the air passageway of the hot water type heater core (12).

According to the construction, since the air passageway of the hot water type heater core (12) is fully closed by the door means (40a, 40b) when the coolant temperature (TW2) of the secondary hot water circuit (13) is lower than the outlet air temperature TE resulting immediately after the passage through the in-compartment heat exchanger (31), a drawback can be prevented that the amount of heat held by the air heated by the inner heat exchanger (31) is absorbed by the hot water type heater core (12). Consequently, the interior of the passenger compartment can be heated immediately in an effective fashion by making effective use of the air heated by the inner heat exchanger (31).

In addition, by fully closing the air passageway of the hot water type heater core (12) by the door means (40a, 40b), the coolant on the secondary hot water circuit (13) side is prevented from dissipating its heat to the air side by the hot water type heater core (12), thereby making it possible to promote further the increase in temperature of the coolant on the secondary hot water circuit (13) side. This prompts the rise in heating function by the hot water type heater core (12).

On the other hand, since the door means (40a, 40b) are controlled to be located at the positions where they close the air passageway of the hot water type heater core (12) when the coolant temperature (TW2) of the secondary hot water circuit (13) becomes higher than the air temperature (TE) resulting after the passage through the inner heat exchanger (31), the air heated through the passage through the inner heat exchanger (31) can be heated again by the hot water type heater core (12). Consequently, the heating performance in the passenger compartment can be exhibited in combination of the inner heat exchanger (31) and the hot water type heater core (12).

In the present invention, the refrigeration cycle (R) includes the heating mode, a cooling mode which allows the inner heat exchanger (31) to function as a refrigerant heat absorber on a low pressure side thereof and a dehumidifying and heating mode which allows the inner heat exchanger (31) to function as a refrigerant heat absorber on the low pressure side thereof and in which cooling air of the inner heat exchanger (31) is heated by the hot water type heater core (12) in such a manner that the heating mode, the cooling mode and the dehumidifying and heating mode are changed over.

According to the construction, in addition to the heating mode, the cooling mode and the dehumidifying and heating mode can be set in such a manner as to be changed over as operation modes of the refrigeration cycle (R).

In the present invention, the automotive air conditioning system includes an inner heat exchanger (31) provided on the low pressure side of the refrigeration cycle (R) for cooling the passenger compartment outlet air by functioning as a refrigerant heat absorber on the low pressure side when in the cooling mode, and a low-pressure refrigerant of the refrigeration cycle (R) flows while bypassing the inner heat exchanger (31) when in the heating mode.

Thus, in the event that the inner heat exchanger (31) is provided on the low pressure side of the refrigeration cycle (R) so as to function only as the refrigerant heat absorber, since no changeover occurs between a heat absorbing function and a heat dissipating function, condensed water is evaporated when the inner heat exchanger (31) dissipates heat therefrom, whereby the drawback of the windows of the vehicle getting fogged is prevented.

In addition, since the heat absorbing function of the inner heat exchanger (31) can be stopped by allowing the low pressure refrigerant to flow while bypassing the inner heat exchanger (31) when in the heating mode, an unnecessary air cooling operation by the inner heat exchanger (31) can be stopped, thereby making it possible to exhibit well the heating performance by the hot water type heater core (12).

In the present invention, the inner heat exchanger (31) is disposed on an upstream side of the hot water type heater core (12) in a passageway of the passenger compartment outlet air, and the refrigeration cycle (R) includes the heating mode, the cooling mode and the dehumidifying and heating mode which allows the inner heat exchanger (31) to function as a refrigerant heat absorber on the low pressure side thereof and in which cooling air of the inner heat exchanger (31) is heated by the hot water type heater core (12) in such a manner that the heating mode, the cooling mode and the dehumidifying and heating mode are changed over.

Thus, even in the construction in which the inner heat exchanger (31) is provided on the low pressure side of the cycle, the heating mode, the cooling mode and the dehumidifying and heating mode can be set so as to be changed over.

In the present invention, the coolant-refrigerant heat exchanger (20) is disposed on the upstream side of the hot water heater core (12) in the secondary hot water circuit (13).

According to this construction, hot water of a high temperature that is heated by the coolant-refrigerant heat exchanger (20) can be introduced immediately into the hot water type heater core (12). Consequently, the heat of the high-temperature hot water that has been so heated can be used effectively to heat the interior of the passenger compartment without being wasted at other locations.

In the present invention, with the use of carbon dioxide as a refrigerant of the refrigeration cycle (R), the temperature of a refrigerant discharged from the compressor can be increased much higher when compared with a normally used chlorofluorocarbon system refrigerant due to the physical properties of the carbon dioxide refrigerant, thereby making it possible to effectively increase the heating performance.

In the present invention, specifically speaking, the heat generator is a fuel cell (10).

Note that the parenthesized reference numerals after the respective constituent devices are such as to denote a corresponding relationship with specific devices which are described in embodiments which will be described later on.

The present invention may be more fully understood from the description of preferred embodiments of the invention, as set forth below, together with the accompanying drawings.

DESCRIPTION OF THE PREFERRED EMBODIMENTS

First Embodiment

Figure 1:
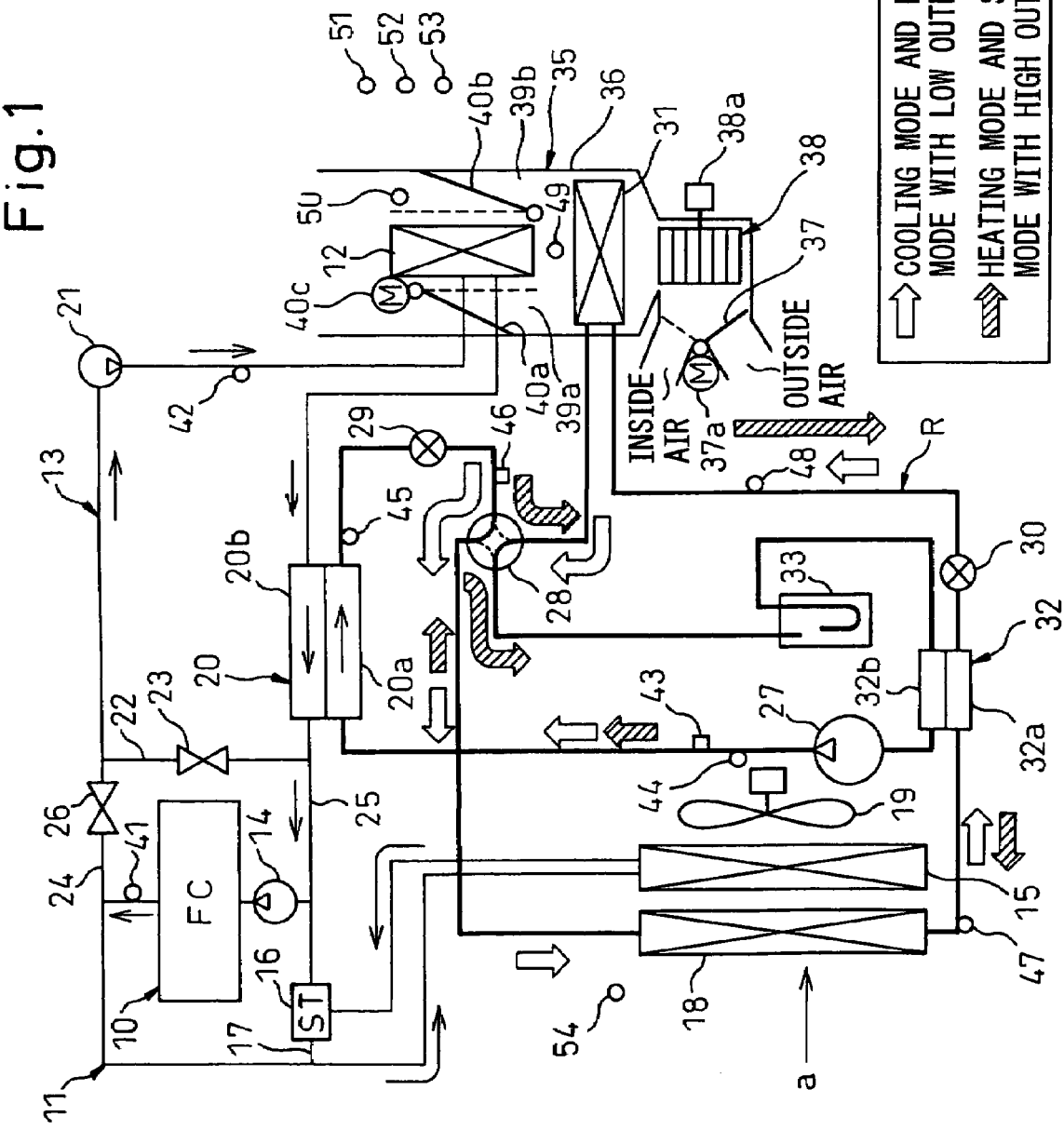
FIG. 1 is an overall system configuration diagram according to a first embodiment of the invention which includes a refrigeration cycle, a hot water circuit and an inner air conditioning unit.

FIG. 1 is an overall system configuration diagram including a refrigeration cycle R, a hot water circuit and an inner air conditioning unit portion. In this embodiment, an example is illustrated in which an apparatus according to the invention is applied to a fuel cell installed vehicle having a fuel cell (FC stack). 10 which generates electric power that is supplied to an automotive driving motor (not shown).

As is generally known, the fuel cell 10 is such as to function to generate electric power through a chemical reaction between oxygen and hydrogen, and when the fuel cell 10 generates electric power, heat is generated together with electric energy. In order to generate electric power efficiently using the fuel cell 10, the fuel cell 10 needs to be cooled so as to be maintained in an appropriate temperature range (for example, on the order of 60 to 80°). To make this happen, in this embodiment, the fuel cell 10 is provided along a hot water (coolant) circuit through which coolant circulates so as to be cooled by the coolant.

In contrast, when the temperature is low, the fuel cell 10 is heated by the coolant in the hot water circuit so that the temperature of the fuel cell 10 can be increased quickly to an efficient and appropriate temperature range.

The hot water circuit is, to be specific, made up of a primary hot water circuit 11 on a side which faces the fuel cell 10 side and a secondary hot water circuit 13 on a side which faces a hot water type heater core 12 for heating the interior of a passenger compartment of a vehicle.

The primary hot water circuit 11 is made up of the fuel cell 10, an electric water pump 14, a radiator 15, a thermostat 16 and a radiator bypass passageway 17. As is generally known, the thermostat 16 is such as to open and close a passageway on the radiator 15 side by making use of volume change triggered by the temperature of thermo wax. The radiator bypass passageway 17 is made up of a throttle passageway having a high pressure loss and is normally opened.

Since the thermostat 16 closes the passageway on the radiator 15 side when the temperature of coolant is low, coolant in the primary hot water circuit 11 flows through the radiator bypass passageway 17. In contrast to this, when the temperature of coolant is increased to a predetermined temperature (for example, in the vicinity of 80°) or higher, the thermostat 16 opens the passageway on the radiator 15 side. Since the passageway on the radiator 15 side has a lower pressure loss than that of the radiator bypass passageway 17, most of the coolant in the primary hot water circuit 11 flows through the radiator 15 side passageway, whereby the coolant so flowing is cooled by the radiator 15.

The radiator 15 is disposed on a downstream side of an air flow in an outer heat exchanger 18 and dissipates heat towards cooling air (outside air) a that is sent in by an electric cooling fan 19.

The secondary hot water circuit 13 is made up of the hot water type heater core 12 for heating the interior of the passenger compartment, a coolant-refrigerant heat exchanger 20 of the refrigeration cycle R, an electric water pump 21 and a fuel cell bypass passageway 22, and an opening and closing valve 23, which is electrically controlled to open and close, is provided along the fuel cell bypass passageway 22.

Note that the primary hot water circuit 11 and the secondary hot water circuit 13 are connected to each other by communication passageways 24, 25. An opening and closing valve 26, which is electrically controlled to open and close, is provided in the communication passageway 24 situated on a coolant outlet side of the fuel cell 10.

In addition to the outer heat exchanger 18 and the coolant-refrigerant heat exchanger 20, there are provided along the refrigeration cycle R an electric compressor 27, a 4-way valve 28 which constitutes a coolant flow diverter valve, a primary pressure-reducing device 29, a secondary pressure-reducing device 30, an inner heat exchanger 31, an internal heat exchanger 32 and an accumulator 33, and the refrigeration cycle R is made up of these devices.

The electric compressor 27 is a pump device for sucking and compressing a refrigerant, and in this embodiment, as the electric compressor 27, a compressor is used in which the rotational speed thereof can be continuously controlled through inverter control. Note that in this embodiment, carbon dioxide ($CO_2$) is used as a refrigerant for the refrigeration cycle R. The refrigeration cycle which uses carbon dioxide as refrigerant constitutes a supercritical cycle in which a cycle high pressure (compressor discharge pressure) becomes a critical pressure of higher.

The coolant-refrigerant heat exchanger 20 has a high-pressure refrigerant passageway 20a through which a high-temperature, high-pressure refrigerant discharged from the compressor flows and a coolant passageway 20b through which coolant in the secondary hot water circuit 13 flows, and heat exchange is performed between the refrigerant discharged from the compressor and the coolant which flow in an opposite direction.

The 4-way valve 28 is a diverter valve in which a flow of refrigerant is diverted in directions indicated by thick white arrows and thick shaded arrows in accordance with various operation modes by means of a valve device which can be controlled electrically. Note that in FIG. 1, the thick white arrows indicate a flow of refrigerant when in a cooling mode and a primary dehumidifying mode with a low outlet temperature, which will be described later on, whereas the thick shaded arrows indicate a flow of refrigerant when in a heating mode and a secondary dehumidifying mode with a high outlet temperature, which will also be described later on.

Both the primary pressure-reducing device 29 and the secondary pressure-reducing device 30 are a variable throttle means which can electrically regulate a refrigerant throttle passage area, and in this embodiment, the primary pressure-reducing device 29 and the secondary pressure-reducing device 30 are made up of an electric expansion valve, respectively. This electric expansion valve is designed such that the throttle opening can be changed continuously by an electric actuator from a fully opened state in which there is almost no pressure loss to a predetermined opening where refrigerant is expanded so as to be reduced in pressure.

The internal heat exchanger 32 has a high-pressure refrigerant flow path 32a through which a high-pressure refrigerant flows when in the cooling mode and the primary dehumidifying mode with a low outlet temperature where refrigerant flows in the direction indicated by the thick white arrows and a low-pressure refrigerant flow path 32b through which a low-pressure refrigerant on a suction side of the electric compressor 27 (a sucked refrigerant) and is such as to perform a heat exchange between the high-pressure refrigerant and the low-pressure refrigerant which flow in an opposite direction.

In addition, as is generally known, the accumulator 33 is such as to divide a refrigerant into a gas-phase refrigerant and a liquid-phase refrigerant and stores an extra refrigerant as a liquid-phase refrigerant, as well as supplying the gas-phase refrigerant to the suction side of the electric compressor 27.

Next, the inner air conditioning unit portion 35 of the automotive air conditioning system will be described. This inner air conditioning unit portion 35 is disposed in an interior portion of an instrument panel (not shown) of the vehicle which is situated at a front part of the passenger compartment. The inner air conditioning unit portion 35 has an air conditioning casing 36 through which air flows towards the interior of the passenger compartment, and an inside air/outside air changeover door 37 is provided at a location of the air conditioning casing 36 which is situated at an uppermost upstream side of the air flow, which inside air/outside air changeover door 37 changes over air that is introduced into the air conditioning casing 36 between inside air (air in the passenger compartment) and outside air (air outside the passenger compartment). This inside air/outside air changeover door 37 is opened and closed by an electric actuator 37a using a motor.

An inner blower 38 is disposed directly downstream of the inside air/outside air changeover door 37 for sending air into the interior of the air conditioning casing 36. The inner blower 38 is an electric blower driven by a motor 38a.

The inner heat exchanger 31 of the refrigeration cycle R is disposed downstream of the inner blower 38. Air sent by the inner blower 38 is heated or cooled by means of the inner heat exchanger 31. The aforesaid hot water type heater core 12 is such as to heat outlet air into the passenger compartment or passenger compartment outlet air by using coolant as a heat source and is disposed at a central portion of a passageway inside the air conditioning casing 36 on a downstream side of an air flow which flows through the inner heat exchanger 31.

By adopting this construction, bypass passageways 39a, 39b are formed on both sides of the hot water type heater core 12. Air mixing doors 40a, 40b are disposed in the bypass passageways 39a, 39b, respectively, in such a manner as to interlock with each other. These air mixing doors 40a, 40b are door devices which open and close an air passageway (core surface) of the hot water type heater core 12 and the bypass passageways 39a, 39b and are operated so as to rotate by an electric actuator 40c.

While the air mixing doors 40a, 40b basically function to change over air flow between an air flow directed towards the air passageway of the hot water type heater core 12 and an air flow directed towards the bypass passageways 39a, 39b, on top of that function, the air mixing doors 40a, 40b also function to regulate the temperature of air blown into the passenger compartment by regulating an air amount ratio between, of the air which has passed through the inner heat exchanger 31, hot air which is heated during the passage through the hot water type heater core 12 and cool air which bypasses the hot water type heater core 12 in a specific condition such as the heating mode and the dehumidifying mode, which will be described later on.

Then, a plurality of outlet openings (not shown) through which conditioned air is blown out into the passenger compartment are provided downstream of the hot water type heater core 12 or at a location situated on a lowermost downstream side of the air flow which flows through the air conditioning casing 36. As the plurality of outlet openings, there are provided defroster openings through which conditioned air is blown towards an interior surface of a windshield glass, face openings through which conditioned air is blown towards an upper half of the body of passengers and foot openings through which conditioned air is blown towards the foot portions of the passengers, and the openings are opened and closed by outlet mode doors, not shown.

Next, a group of sensors will be described which are used for automatic air conditioning according to the embodiment. Firstly, a primary coolant temperature sensor 41 for detecting the temperature of outlet coolant from the fuel cell 10 is provided at a coolant outlet portion of the fuel cell 10 in the primary hot water circuit 11. In addition, a secondary coolant temperature sensor 42 for detecting the temperature inlet coolant into the hot water heater core 12 is provided at a coolant inlet portion of the hot water type heater core 12 in the secondary hot water circuit 13.

Next, in the refrigeration cycle R, a refrigerant discharge pressure sensor 43 for detecting a refrigerant discharge pressure and a refrigerant discharge temperature sensor 44 for detecting a refrigerant discharge temperature are provided on the discharge side of the electric compressor 27. An outlet refrigerant temperature sensor 45 for detecting an outlet refrigerant temperature is provided at an outlet portion of the high-pressure refrigerant passageway 20a of the coolant-refrigerant heat exchanger 20. A refrigerant intermediate pressure sensor 46 is provided at an outlet portion of the primary pressure-reducing device 29 for detecting the pressure of refrigerant which has been reduced in pressure by the primary pressure-reducing device 29, that is, a refrigerant intermediate pressure.

An outlet refrigerant temperature sensor 47 is provided at a location which constitutes a refrigerant outlet portion of the outer heat exchanger 18 for detecting the temperature of outlet refrigerant from the outer heat exchanger 18 in the flow of refrigerant when in the cooling mode and the primary dehumidifying mode with a low outlet temperature. An outlet refrigerant temperature sensor 48 is provided at a location which constitutes a refrigerant outlet portion of the inner heat exchanger 31 for detecting the temperature of outlet refrigerant from the inner heat exchanger 31 in the flow of refrigerant when in the heating mode and the secondary dehumidifying mode with a high outlet temperature.

Next, in the passenger compartment, there are provided an inside air temperature sensor 51 for detecting a temperature (inside air temperature) in a passenger compartment, a sunlight sensor 52 for detecting the amount of sunlight and a humidity sensor 53 for detecting a humidity in a passenger compartment. On the other hand, outside the passenger compartment or, to be specific, in the vicinity of an upstream portion of an air flow which flows through the outer heat exchanger 18, there is provided an outside air temperature sensor 54 for detecting an outside air temperature.

Figure 2:
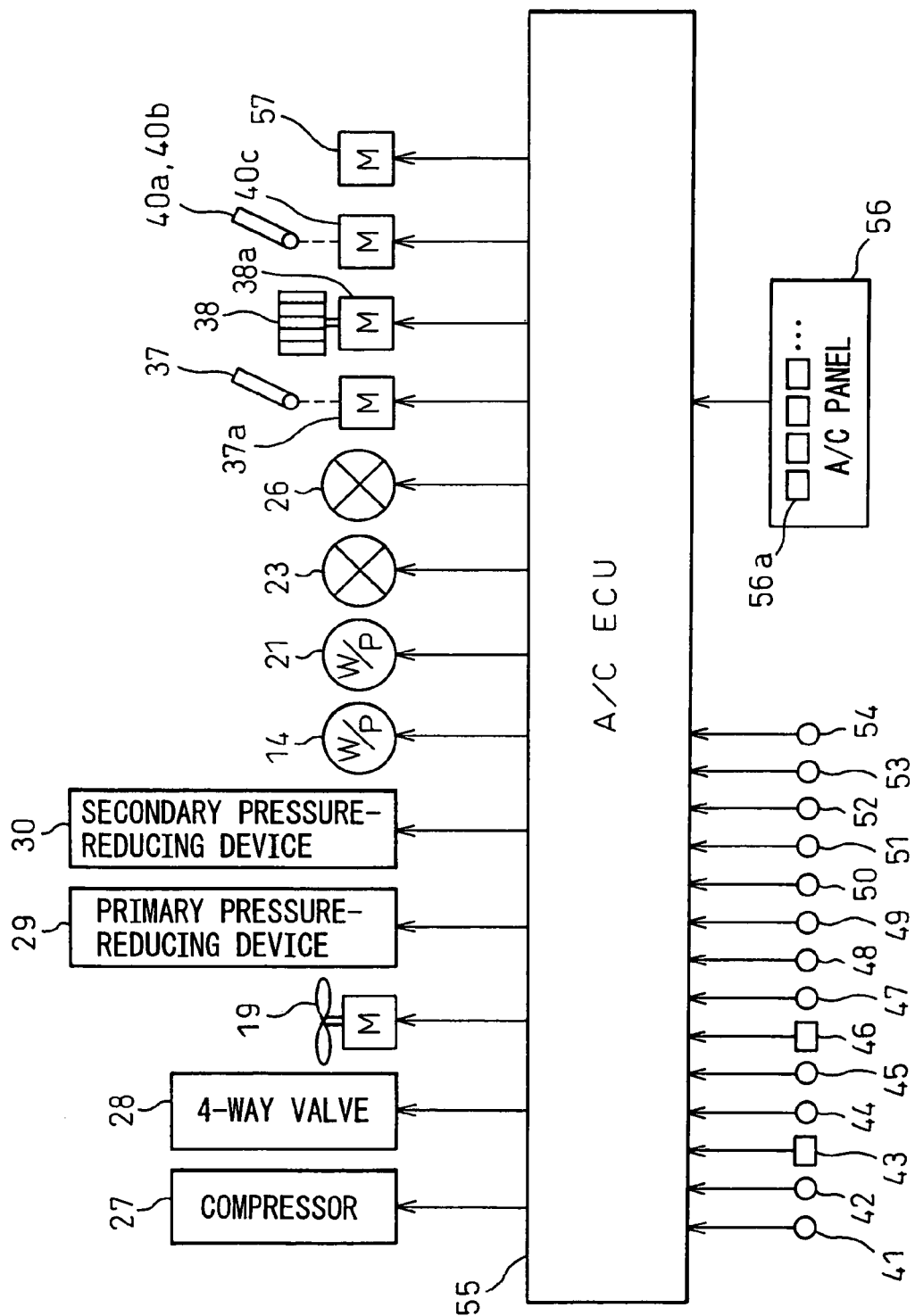
FIG. 2 is a block diagram of an electric control unit according to the first embodiment.

Next, an electric control unit according to the embodiment will be schematically described based on a block diagram shown in FIG. 2. An air conditioning controller 55 is such as to be made up of a generally known microcomputer and its peripheral circuits, and a control program for air conditioning is stored in a ROM, whereby various calculations and processing are performed based on the control program. Sensor detection signals from the group of sensors 41 to 54 and operation signals from various operation members 56a on an air conditioning control panel 56 are inputted to an input side of the air conditioning controller 55.

The air conditioning control panel 56 is such as to be disposed in the vicinity of an instrument panel (not shown) in front of the driver's seat, and as the various operation members 56a, there are provided a temperature setting member for setting the temperature in the passenger compartment to a desired temperature (a set temperature), an inside air/outside air changeover member for outputting a signal which manually sets the inside air mode and the outside air mode which are controlled by the inside air/outside air changeover door 37, a blower speed changeover member for outputting a signal which manually sets the amount of air blown out by the in-compartment blower 38 or the speed thereof, an outlet mode changeover member for outputting a signal which manually sets the outlet mode for air blown out into the passenger compartment, an auto switch for outputting a command signal which instructs an automatic air conditioning and a cooling mode switch for outputting an cooling mode command signal to the inner heat exchanger 31.

The various types of air conditioning devices which are described by reference to FIG. 1 are connected to an output side of the air conditioning controller 55 as objects to be controlled thereby. Among the various types of air conditioning devices which constitutes the objects to be controlled by the air conditioning controller 55, reference numeral 57 denotes an electric actuator for driving the outlet mode doors, which is not shown in FIG. 1.

Figure 3:
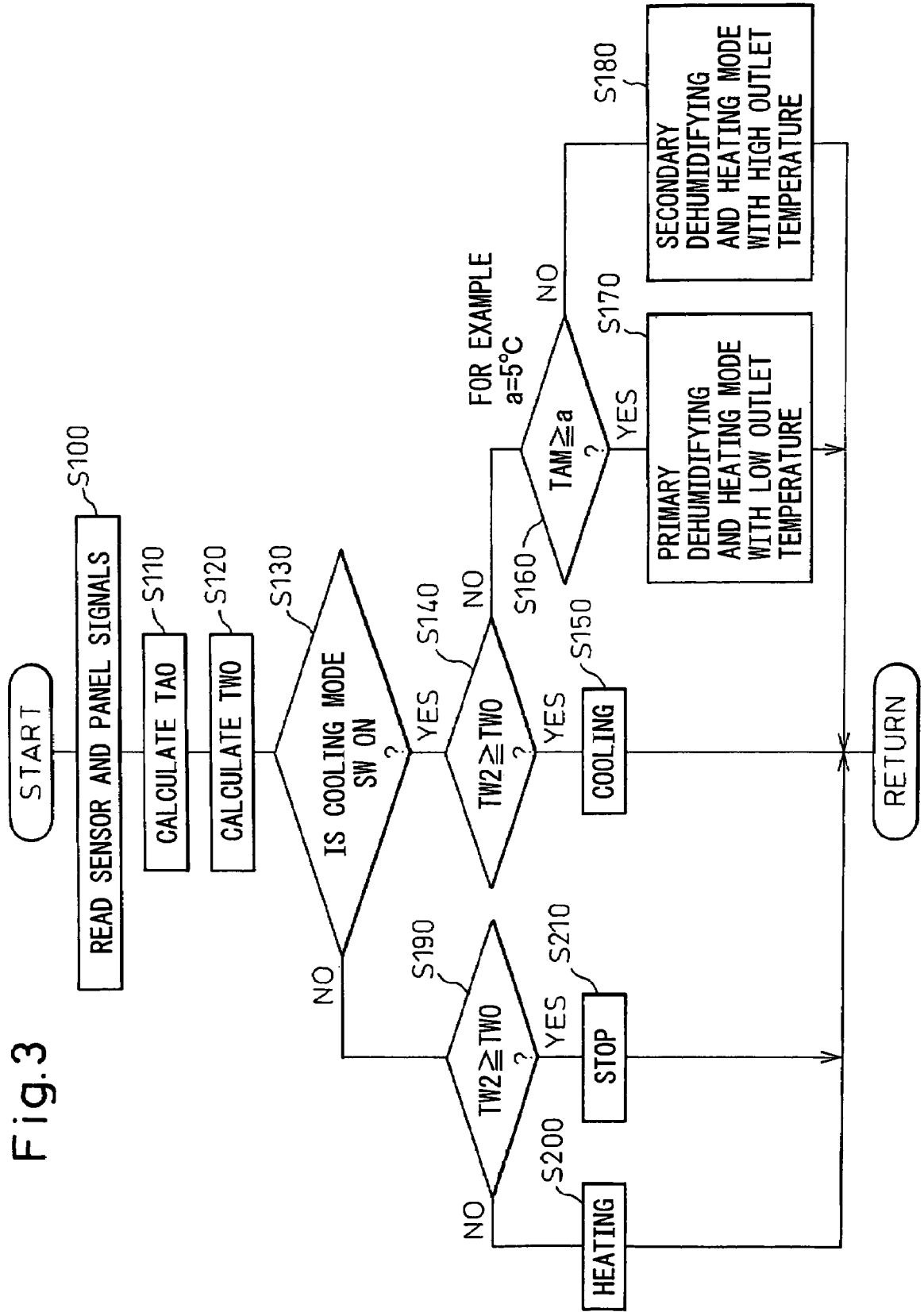
FIG. 3 is a flowchart illustrating a method of determining a refrigeration cycle operation mode according to the first embodiment.

Next, the operation of the embodiment, which is constructed as has been described heretofore, will be described. FIG. 3 is a flowchart illustrating the summary of a control executed by the microcomputer of the air conditioning controller 55, and a control routine in FIG. 3 starts when, among the various operation members 56a on the air conditioning control panel 56, the auto switch is made, and firstly, in Step S100, sensor signals from the group of sensors 41 to 54 and operation signals from the various operation members 56a on the air conditioning control panel 56 are read.

Next, in step 110, a target outlet temperature TAO of the outlet air into the passenger compartment is calculated. Here, irrespective of change in air conditioning thermal load in the passenger compartment, the target outlet temperature TAO is a temperature necessary to maintain the temperature inside the passenger compartment (inside air temperature) to a set temperature which is set by the temperature setting member on the air conditioning control panel 56 and is, as is generally known, calculated based on an inside air temperature detected by the inside air temperature sensor 51, an outside air temperature detected by the outside air temperature sensor 54, an amount of sunlight detected by the sunlight sensor 52 and a set temperature set by the temperature setting member.

Next, in step S120, a target coolant temperature TWO of coolant (hot water) which flows into the hot water type heater core 12 is calculated based on the TAO calculated as described above. Specifically speaking, the target coolant temperature TWO is calculated using an equation, TWO=TAO/$\phi$. Here, since $\phi$ is a heat exchanger temperature efficiency of the hot water type heater core 12, TWO becomes a temperature that is higher than TAO.

Next, in step S130, whether or not the cooling mode switch is made is determined. Here, the cooling mode switch is such as to output a cooling mode command signal to the inner heat exchanger 31, and if the determination in step S130 is YES, then proceed to step S140, where whether or not a coolant temperature (a coolant temperature on the inlet side of the hot water heater core 12) TWO detected by the temperature sensor 42 is the target coolant temperature TWO or higher is determined.

In a condition in summer where cooling is necessary, since TAO becomes a temperature that is sufficiently lower than the outside air temperature, TWO is also a temperature that is lower than the outside air temperature. Therefore, in the condition where cooling is necessary, the determination in step S140 becomes YES, and in step S150, the cooling mode is determined as the refrigeration cycle operation mode, whereby the cooling mode is executed.

In addition, if the determination in step S140 is NO, then proceed to step S160, where whether or not an outside air temperature TAM detected by the outside air temperature sensor 54 is the set temperature a (for example, 5°) or higher is determined. Since the determination in this step S160 is such as to determine the magnitude of heating load based on the outside air temperature TAM and if the determination in step S160 is YES, it denotes a time period when the heating load is low, then proceed to step S170, where the primary dehumidifying and heating mode, that is, a dehumidifying and heating mode with a low passenger compartment outlet temperature is determined and executed as the refrigeration cycle operation mode.

In addition, if the determination in step S160 is NO, since it denotes a time period when the heating load is high, then proceed to step S180, where the secondary dehumidifying and heating mode, that is, a dehumidifying and heating mode with a high passenger compartment outlet temperature is determined and executed as the refrigeration cycle operation mode.

On the other hand, when the cooling mode switch on the air conditioning control panel 56 is not made, the determination in step S130 becomes NO, and then proceed to step S190, where whether or not a coolant temperature on the inlet side of the hot water type heater core 12 is the target coolant temperature TWO or higher is determined.

If the determination in step S190 is NO, the heating mode is determined and executed as the refrigeration cycle operation mode in step S200. In addition, if the determination in step S190 is YES, since the interior of the passenger compartment can be heated to the set temperature only by the air heating function by a hot water heat source of the hot water type heater core 12, the operation of the heating mode of the refrigeration cycle becomes unnecessary. Then, in step S210, a stop mode of the refrigeration cycle R is determined, and the operation (operation of the compressor 27) of the refrigeration cycle R is stopped, so that a required heating performance is exhibited only by the hot water type heater core 12.

Next, the operation of the air conditioning system for each operation mode of the refrigeration cycle R that is determined as has been described above will be described below.

1. Cooling Mode (S150 in FIG. 3)

In the cooling mode, since the refrigerant flow path of the 4-way valve 28 is changed over to a state indicated by thick solid lines in FIG. 1 by the control and output of the air conditioning controller 55, in the refrigeration cycle R, when the electric compressor 27 is activated, refrigerant circulates along a refrigerant path which begins from the discharge side of the electric compressor 27 and terminates at the suction side of the electric compressor 27 via the coolant-refrigerant heat exchanger 20→the primary pressure-reducing device 29→the 4-way valve 28→the outer heat exchanger 18→the high-pressure side refrigerant flow path 32a of the internal heat exchanger 32→the secondary pressure-reducing device 30→the inner heat exchanger 31→the 4-way valve 28→the accumulator 33→the low-pressure side refrigerant flow path 32b of the internal heat exchanger 32 as indicated the thick white arrows.

As this occurs, since the primary pressure-reducing device 29 is maintained in the fully opened state where there is generated almost no pressure loss, the outer heat exchanger 18 functions as a radiator for the high-pressure side refrigerant. In contrast to this, since the secondary pressure-reducing device 30 is controlled to be at a predetermined throttle opening, which will be described later on, so as to reduce the pressure of the high-pressure side refrigerant, the inner heat exchanger 31 functions as an evaporator on the low pressure side.

Consequently, the high temperature, high pressure refrigerant that is discharged from the electric compressor 27 dissipates its heat to the coolant in the coolant-refrigerant heat exchanger 20 so as to reduce the temperature thereof. The high-pressure refrigerant that has passed through the coolant-refrigerant heat exchanger 20 passes through the primary pressure-reducing device 29 while kept in the high pressure state without being reduced in pressure thereat and continues to flow into the outer heat exchanger 18. In this outer heat exchanger 18, the high-pressure refrigerant exchanges heat with outside air so as to dissipate its heat thereto, whereby the temperature thereof is reduced further.

The high-pressure refrigerant, which has passed through the outer heat exchanger 18, exchanges heat with a low temperature, low pressure refrigerant (refrigerant sucked into the compressor) in the internal heat exchanger 32 and dissipates its heat further, whereby the temperature thereof is reduced. Thereafter, the high-pressure refrigerant is reduced in pressure at the secondary pressure-reducing device 30 so as to be in a low temperature, low pressure gas-liquid two-phase state.

Since this low pressure refrigerant flows into the inner heat exchanger 31 and absorbs heat from air sent in from the inner blower 38 so as to be evaporated, the inner heat exchanger 31 functions as a cooling device (a heat absorber) which cools air sent in by the inner blower 38.

In the cooling mode, since the air mixing doors 40a, 40b are maintained at the positions (positions indicated by dotted lines in FIG. 1) where they fully close the air passageway (the core surface) of the hot water type heater core 12, the whole amount of cool air that has been cooled during the passage through the inner heat exchanger 31 is allowed to pass through the bypass passageways 39a, 39b of the heater core 12 so as to be blown out into the passenger compartment.

The temperature control of the passenger compartment outlet air is performed through capability control (rotational speed control) of the electric compressor 27. Namely, the capability control (rotational speed control) of the electric compressor 27 may be performed such that the outlet air temperature TE of the inner heat exchanger 31 that is detected by the temperature sensor 49 becomes the target outlet temperature TAO.

Note that in the cooling mode, the outlet refrigerant temperature of the outer heat exchanger 18 is detected by the temperature sensor 47, a target high pressure PO at which the coefficient of performance (COP) of the refrigeration cycle R becomes maximum is calculated based on the high-pressure refrigerant temperature at the outlet of the outer heat exchanger, and the throttle opening of the secondary pressure-reducing device 30 is controlled such that a compressor discharge pressure detected by the pressure sensor 43, that is, an actual high pressure PH becomes the target high pressure PO so calculated, thereby attempting to increase the efficiency of the refrigeration cycle R.

On the other hand, to describe the operation on the hot water circuit side in the cooling mode, in the cooling mode, the opening and closing valve 26 between the primary and secondary hot water circuits 11, 13 is opened, and the opening and closing valve 23 on the secondary hot water circuit 13 is closed, whereby since there is a state in which the primary hot water circuit 11 and the secondary hot water circuit 13 are connected to each other so as to form a single hot water circuit, by activating the water pumps 14, 21, coolant for the fuel cell 10 circulates through both the primary hot water circuit 11 and the secondary hot water circuit 13.

In the primary hot water circuit 11, since the thermostat 16 closes the passage on the radiator 15 side, when the temperature of the coolant that has passed through the fuel cell 10 becomes a predetermined temperature that is set by the thermo wax of the thermostat 16 or higher, the coolant flows through the radiator 15. Due to this, the coolant dissipates its heat to the outside air in the radiator 15 to thereby be cooled. The coolant, which has passed through the radiator 15, merges with coolant on the secondary hot water circuit 13 side to thereby be sucked by the water pump 14 and then returns to the fuel cell 10 so as to cool the fuel cell 10.

In contrast to this, in the secondary hot water circuit 13, the coolant that has passed through the fuel cell 10 passes through the opening and closing valve 26 and flows into the secondary hot water circuit 13, and the coolant that has so flowed into the secondary hot water circuit 13 passes through the water pump 21 to thereby flow into the heater core 12. Here, since the air passageway of the heater core 12 is closed fully by the air mixing doors 40a, 40b, the coolant dissipates no heat in the heater core 12.

Next, the coolant that has passed through the heater core 12 absorbs heat from a high temperature refrigerant discharged from the compressor while passing through the coolant passageway 20a of the coolant-refrigerant heat exchanger 20, and the temperature of the coolant is increased. Thereafter, the coolant whose temperature is so increased merges with the coolant that has passed through the radiator 15. Consequently, when in the cooling mode, part of the amount of heat of the refrigerant discharged from the compressor of the refrigeration cycle R passes through the radiator 15 of the primary hot water circuit 11 to thereby be dissipated to the outside air.

In addition, when the thermostat 16 closes the passageway on the radiator 15 side, the rise of coolant temperature is prompted by the amount of heat dissipated from the refrigerant discharged from the compressor to the coolant side in the coolant-refrigerant heat exchanger 20, whereby the temperature of the fuel cell 10 is increased quickly to a temperature at which good efficiency can be provided.

2. Heating Mode (S200 in FIG. 3)

In the heating mode, since the refrigerant flow path of the 4-way valve 28 is changed over to a state indicated by dotted lines in FIG. 1 by the control and output of the air conditioning controller 55, in the refrigeration cycle R, when the electric compressor 27 is activated, refrigerant circulates along a refrigerant path which begins from the discharge side of the electric compressor 27 and terminates at the suction side of the electric compressor 27 via the coolant-refrigerant heat exchanger 20→the primary pressure-reducing device 29→the 4-way valve 28→the inner heat exchanger 31→the secondary pressure-reducing device 30→the refrigerant flow path 32a of the internal heat exchanger 32→the outer heat exchanger 18→the 4-way valve 28→the accumulator 33→the refrigerant flow path 32b of the internal heat exchanger 32 as indicated the thick shaded arrows.

Also in the heating mode, since the primary pressure-reducing device 29 is maintained in the state where there is generated almost no pressure loss, the refrigerant discharged from the compressor flows into the inner heat exchanger 31 as maintained in the high pressure state. Consequently, the inner heat exchanger 31 functions as a radiator for refrigerant on the high pressure side. In contrast to this, since the secondary pressure-reducing device 30 is controlled to a predetermined throttle opening, which will be described later on, so as to reduce the pressure of the refrigerant on the high pressure side, the outer heat exchanger 18 functions as a heat absorber (evaporator) for refrigerant on the low pressure side.

Consequently, in the heating mode, the high temperature, high pressure refrigerant that is discharged from the electric compressor 27 first dissipates its heat to coolant in the coolant-refrigerant heat exchanger 20, whereby the temperature of the refrigerant is reduced. The high pressure refrigerant that has passed through the coolant-refrigerant heat exchanger 20 flows through the primary pressure-reducing device 29 without being reduced in pressure thereby and then flows into the inner heat exchanger 31 as maintained in the high pressure state.

Consequently, since the high pressure refrigerant dissipates its heat to the air (low temperature air in the winter season) sent in by the inner blower 38 in the inner heat exchanger 31, the air so sent in by the inner blower 38 is heated. The heated air is heated further in the hot water type heater core 12 and is then blown out into the passenger compartment, whereby the interior of the passenger compartment is heated.

Here, the operation specific to the heating mode will be described based on a flowchart shown in FIG. 4. Firstly, in step S300, by comparing the outlet air temperature TE of the inner heat exchanger 31 (the temperature detected by the sensor 49) with the coolant temperature TW2 of coolant flowing into the heater core 12 (the temperature detected by the sensor 42), if the outlet air temperature TE is higher than the coolant temperature TW2, then proceed to step S310, where the air mixing doors 40a, 40b are operated to be located at positions (positions indicated by broken lines in FIG. 1) where they fully close the air passageway of the hot water type heater core 12, whereby the heating air in the inner heat exchanger 31 flows through the bypass passageways 39a, 39b of the hot water type heater core 12 to thereby prevent the temperature of outlet air into the passenger compartment from decreasing.

On the other hand, if the coolant temperature TW2 is higher than the outlet air temperature, then the process proceeds to step S320, where the air mixing doors 40a, 40b are operated to be located at positions (positions indicated by solid lines in FIG. 1) where they fully open the air passageway of the hot water type heater core 12, whereby the whole amount of air that has been heated by the inner heat exchanger 31 is heated again by the hot water type heater core 12 to thereby increase the temperature of outlet air into the passenger compartment.

As is seen from steps S190, S200 described previously by reference to FIG. 3, the heating mode is determined when TW2<TWO, and in this coolant temperature condition, the refrigeration cycle R is activated, and the capability control (rotational speed control) of the electric compressor 27 is performed such that the coolant temperature TW2 of the coolant flowing into the hot water type heater core 12 (the temperature detected by the sensor 42) becomes the target coolant temperature TWO. Then, in this case, the air mixing doors 40a, 40b are maintained at the positions (the positions indicated by the solid lines in FIG. 1) where they fully open the air passageway of the hot water type heater core 12, so that air heated by the inner heat exchanger 31 is heated again to a maximum extent so as to increase the heating performance.

Note that in a case where the coolant temperature TW2 is increased to the target coolant temperature TWO only by waste heat of the fuel cell 10, since the stop mode is determined in step S210 in FIG. 3 so as to stop the operation of the refrigeration cycle R, the air mixing doors 40a, 40b are controlled to be situated at predetermined positions where the ratio in amount of cool air and hot air is regulated, whereby the temperature of passenger compartment outlet air is regulated so as to become the target temperature TAO.

Next, in step S330, the coolant temperature TW1 of the primary hot water circuit 11 (the temperature detected by the sensor 41) is compared with the coolant temperature TW2 of the secondary hot water circuit 13 (the temperature detected by the sensor 42). Since, when the fuel cell 10 is started, the coolant temperature TW1 of the primary hot water circuit 11 and the coolant temperature TW2 of the secondary hot water circuit 13 stay at an equal temperature, the determination in step S330 becomes NO, and then proceed to step S340, where the opening and closing valve 26 is put in the closed state, whereas the opening and closing valve 23 is put in the opened state, whereby there is set a state in which no coolant circulates between the primary hot water circuit 11 and the secondary hot water circuit 13, that is, a state in which the two hot water circuits 11, 13 are cut off from each other.

Consequently, the coolant is heated by the fuel cell 10 in the primary hot water circuit 11, whereby the coolant temperature is increased. On the other hand, in the secondary hot water circuit 13, the coolant is heated by heat dissipated from the high pressure refrigerant in the coolant-refrigerant heat exchanger 20, whereby the coolant temperature is increased.

When heat is dissipated from the high pressure refrigerant in the coolant-refrigerant heat exchanger 20, by separating the secondary hot water circuit 13 from the primary hot water circuit 11, the amount of coolant from which heat is dissipated in the coolant-refrigerant heat exchanger 20 can be limited only to the small amount of coolant that is held within the secondary hot water circuit 13. As a result, the temperature of the coolant within the secondary hot water circuit 13 can be quickly increased by heat dissipated in the coolant-refrigerant heat exchanger 20.

On the other hand, when a certain time has elapsed since the start up of the fuel cell 10, the coolant temperature TW1 of the primary hot water circuit 11 is increased by waste heat from the fuel cell 10 and the coolant temperature TW1 becomes higher than the coolant temperature TW2 of the secondary hot water circuit 13, the determination in step S330 becomes YES. Due to this, the process proceeds to step S350, where the opening and closing valve 26 is put in the opened state, whereas the opening and closing valve 23 is put in the closed state, whereby there is set a state in which coolant circulates between the primary hot water circuit 11 and the secondary hot water circuit 13, that is, a state in which the two hot water circuits 11, 13 are connected to each other.

Consequently, in this connected state, coolant flows throughout both the hot water circuits 11, 13, and the coolant so flowing is heated by the waste heat from the fuel cell 10 and heat dissipated from the high pressure refrigerant in the coolant-refrigerant heat exchanger 20, and the coolant dissipates its heat to outlet air into the passenger compartment. Namely, the interior of the passenger compartment can be heated by making use of the waste heat from the fuel cell 10 as well.

In the heating mode, while the capability control (rotational speed control) of the electric compressor 27 is performed such that the coolant temperature TW of coolant flowing into the hot water type heater core 12 (the temperature detected by the sensor 42) becomes the target coolant temperature TWO, in the afore-described state in which both the hot water circuits 11, 13 are connected to each other, since there is a portion of coolant which is heated by the waste heat from the fuel cell 10, a portion of coolant that is heated by the high pressure refrigerant in the coolant-refrigerant heat exchanger 20 only has to correspond to an insufficient portion to increase the coolant temperature to the target coolant temperature TWO using the fuel cell waste heat.

In addition, in the heating mode, the throttle opening control of the secondary pressure-reducing device 30 is also implemented based on the same idea as in the cooling mode. Namely, the outlet coolant temperature of the inner heat exchanger 31 (the high pressure side radiator) is detected by the temperature sensor 48, a target high pressure PO at which the coefficient of performance of the refrigeration cycle R becomes maximum is calculated based on the high pressure refrigerant temperature at the outlet of the inner heat exchanger 31 and the throttle opening of the secondary pressure-reducing device 30 is controlled such that the compressor discharge pressure that is detected by the pressure sensor 43, that is, an actual high pressure PH becomes the target high pressure PO, thereby attempting to increase the efficiency of the refrigeration cycle R.

Note that, in the heating mode, as low pressure refrigerant flows in both the refrigerant passageways, 32a, 32b of the internal heat exchanger 32, there is performed no heat exchange in the internal heat exchanger 32.

3. Primary Dehumidifying and Heating Mode with Low Outlet Temperature (S170 in FIG. 3)

In the primary dehumidifying and heating mode, since the refrigerant flow path of the 4-way valve 28 is changed over to the state indicated by the thick solid lines in FIG. 1 by the control and output of the air conditioning controller 55, in the refrigeration cycle R, when the electric compressor 27 is activated, the refrigerant circulates along the same refrigerant flow path as that used when in the cooling mode, which is indicated by the thick white arrows. Namely, the refrigerant circulates along the refrigerant path which begins from the discharge side of the electric compressor 27 and terminates at the suction side of the electric compressor 27 via the coolant-refrigerant heat exchanger 20→the primary pressure-reducing device 29→the 4-way valve 28→the outer heat exchanger 18→the high-pressure side-refrigerant flow path 32a of the internal heat exchanger 32→the secondary pressure-reducing device 30→the inner heat exchanger 31→the 4-way valve 28→the accumulator 33→the low-pressure side refrigerant flow path 32b of the internal heat exchanger 32.

However, in the primary dehumidifying and heating mode, by controlling the opening of the primary pressure-reducing device 29 to a predetermined to an intermediate throttle opening, the refrigerant pressure in the outer heat exchanger 18 can be controlled to an intermediate pressure so as to regulate the refrigerant heat dissipation amount in the outer heat exchanger 18, whereby the refrigerant heat dissipation amount to the coolant side in the coolant-refrigerant heat exchanger 20 can be regulated.

The refrigerant at the intermediate pressure whose heat is dissipated to outside air in the outer heat exchanger 18 passes through the inner heat exchanger 31 and then becomes a low temperature, low pressure refrigerant after being reduced in pressure in the secondary pressure-reducing device 30. This low pressure refrigerant next absorbs heat from air sent in by the inner blower 38 in the inner heat exchanger 31 and is thereby evaporated to cool the air so sent in. The refrigerant that has passed through the inner heat exchanger 31 then passes through the 4-way valve 28, the accumulator 33 and the internal heat exchanger 32 and is then sucked into the electric compressor 27.

The air so sent is then heated in the hot water type heater core 12 after having been cooled and dehumidified in the inner heat exchanger 31. As this occurs, the air heating capability in the hot water type heater core 12 can be regulated by regulating the refrigerant heat dissipation amount to the coolant side in the coolant-refrigerant heat exchanger 20 by controlling the opening of the primary pressure-reducing device 29 as has been described above.

In the primary dehumidifying and heating mode, both the coolant-refrigerant heat exchanger 20 and the outer heat exchanger 18 constitute a refrigerant heat dissipating unit, and as the refrigerant heat dissipation amount to the coolant side becomes relatively smaller than in the secondary dehumidifying and heating mode, which will be described below and the refrigerant evaporation temperature in the inner heat exchanger 31 can be made lower than in the secondary dehumidifying and heating mode as will be described below. Consequently, the dehumidifying and heating with a low outlet temperature can be realized which is suitable for a time period when there is a condition in which the outside air temperature is relatively high and the heating thermal load is small.

4. Secondary Dehumidifying and Heating Mode with High Outlet Temperature (S180 in FIG. 3)

In this secondary dehumidifying and heating mode, since the refrigerant flow path of the 4-way valve 28 is changed over to the state indicated by the dotted lines in FIG. 1 by the control and output of the air conditioning controller 55, in the refrigerant cycle R, when the electric compressor 27 is activated, the refrigerant circulates along the same refrigerant flow path as that used when in the heating mode, which is indicated by the thick shaded arrows. Namely, the refrigerant circulates along the refrigerant path which begins from the discharge side of the electric compressor 27 and terminates at the suction side of the electric compressor 27 via the coolant-refrigerant heat exchanger 20→the primary pressure-reducing device 29→the 4-way valve 28→the inner heat exchanger 31→the secondary pressure-reducing device 30→the refrigerant flow path 32a of the internal heat exchanger 32→the outer heat exchanger 18→the 4-way valve 28→the accumulator 33→the refrigerant flow path 32b of the internal heat exchanger 32.

However, in the secondary dehumidifying and heating mode, by reducing the throttle opening of the primary pressure-reducing device 29 and by the pressure reduction amount by the primary pressure-reducing device 29, the inner heat exchanger 31 functions as an evaporator (heat absorber) on the low pressure side. In other words, the throttle opening of the primary pressure-reducing device 29 is reduced sufficiently to such an extent that a pressure reduction amount can be obtained at which the inner heat exchanger 31 can function as the evaporator.

Then, in the secondary dehumidifying and heating mode, both the inner heat exchanger 31 and the outer heat exchanger 18 function as the evaporator on the low pressure side.

Moreover, since the total amount of heat absorbed in both the inner heat exchanger 31 and the outer heat exchanger 18 is dissipated to the coolant side in the coolant-refrigerant heat exchanger 20, the amount of heat dissipated to the coolant side is increased when compared with that in the primary dehumidifying and heating mode, and the air heating capability in the hot water type heater core 12 can be increased.

As a result, in the secondary dehumidifying and heating mode, the passenger compartment outlet temperature can be increased when compared with the primary dehumidifying and heating mode. Consequently, the dehumidifying and heating with a high outlet temperature can be realized which is suitable for a time period when there exists a condition in which the outside air temperature is relatively low and the heating thermal load is large.

Figure 4:
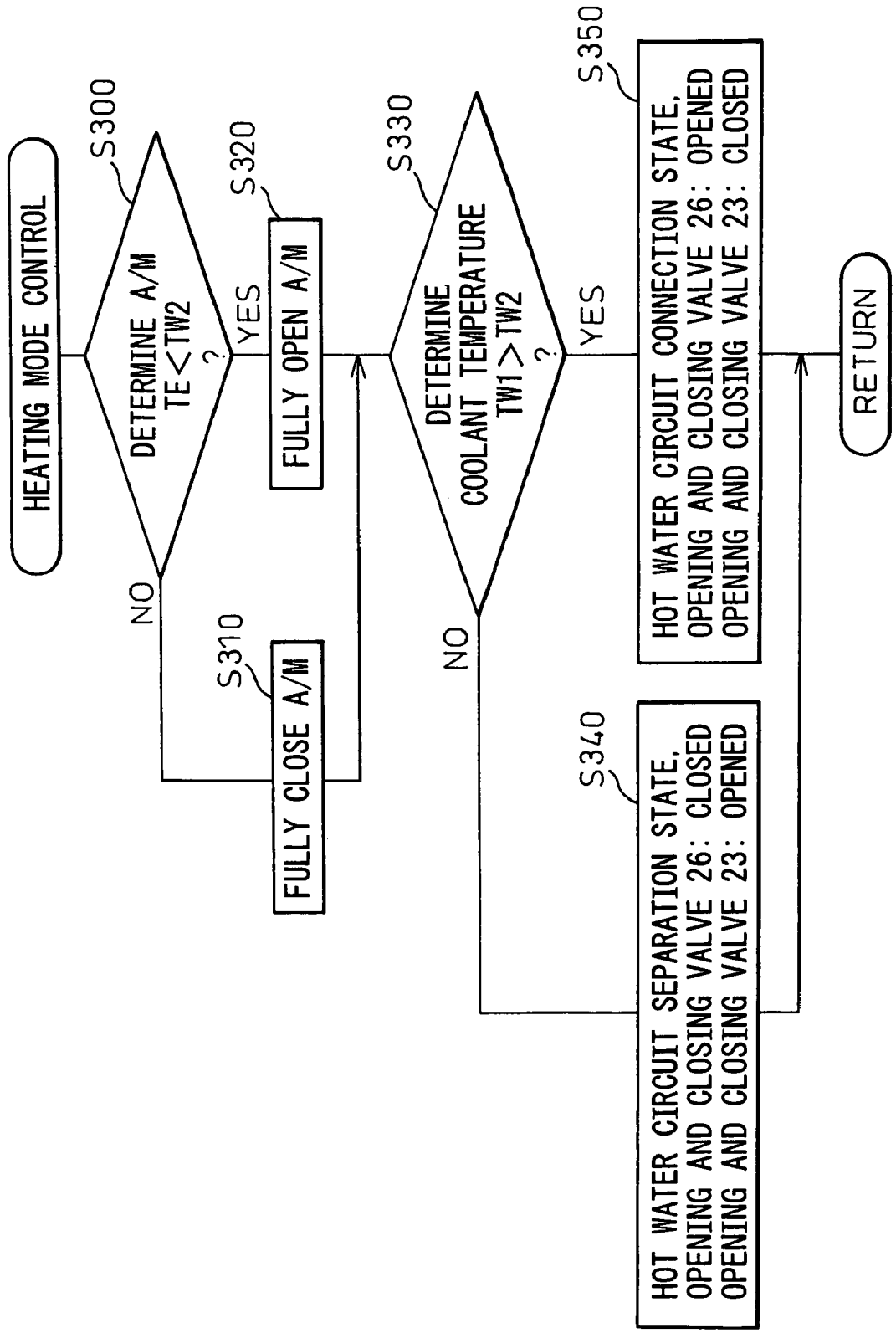
FIG. 4 is a flowchart illustrating a specific example of a heating mode control according to the first embodiment.

Note that as to the opening and closing control of the opening and closing valves 23, 26 on the hot water circuit side both in the primary dehumidifying and heating mode and the secondary dehumidifying and heating mode, controls in steps S330, S340 and S350 shown in FIG. 4 may be performed in the same way as when in the heating mode.

In addition, both in the primary dehumidifying and heating mode and the secondary dehumidifying and heating mode, the opening control of the air mixing doors 40a, 40b may be performed in the same way as when in the heating mode. Namely, when the capability control (the rotational speed control) of the electric compressor 27 is performed such that the coolant temperature TW2 of coolant flowing into the hot water type heater core 12 (the temperature detected by the sensor 42) becomes the target coolant temperature TWO, with the air mixing doors 40a, 40b being maintained at the positions (the positions indicated by the solid lines in FIG. 1) where they fully open the air passageway of the hot water type heater core 12, cooling air in the inner heat exchanger 31 is heated again to a maximum extent by the hot water type heater core 12.

Contrary to this, in the event that the coolant temperature TW2 is increased to reach the target coolant temperature TWO only by the waste heat from the fuel cell 10, the operation mode of the refrigeration cycle R is changed over to the cooling cycle (S150 in FIG. 3), and the air mixing doors 40a, 40b are controlled to predetermined opening positions, so that the passenger compartment outlet temperature is regulated to become the target temperature TAO.

As has been described heretofore, according to the first embodiment, in the heating mode, in the initial stage of starting up the fuel cell 10 in which the coolant temperature on the fuel cell 10 side is low, the passenger compartment outlet air can be heated by the inner heat exchanger 31 in the refrigeration cycle R while heating only the coolant on the secondary hot water circuit 30 by the coolant-refrigerat heat exchanger 20 in the refrigeration cycle R with the secondary hot water circuit 13 having the hot water type heater core 12 being separated from the primary hot water circuit 11 on the fuel cell 10 side.

Here, since the thermal capacity of the inner heat exchanger 31 is largely smaller than that of the coolant-refrigerant heat exchanger 20, the temperature of the inner heat exchanger 31 can be quickly increased after the start up of the refrigeration cycle R. Due to this, the passenger compartment outlet air can be heated by the inner heat exchanger 31 immediately after the start up of the refrigeration cycle R.

Then, since the air passageway of the hot water type heater core 12 is fully closed by the air mixing doors 40a, 40b in the event that the coolant temperature TW2 on the secondary hot water circuit 13 is lower than the outlet air temperature TE immediately after the passage through the inner heat exchanger 31 when comparing the coolant temperature TW2 on the secondary hot water circuit 13 with the outlet air temperature TE immediately after the passage through the inner heat exchanger 31, the drawback can be prevented that the amount of heat of the air heated by the inner heat exchanger 31 is absorbed by the low temperature coolant in the hot water type heater core 12.

Furthermore, the coolant that constitutes an object to be heated by the coolant-refrigerant heat exchanger 20 is limited only to the small amount of coolant that is held on the secondary hot water circuit 13, and therefore, the increase in coolant temperature on the secondary hot water circuit 13 side can be prompted. Consequently, the state in which the air heating function by the hot water type heater core 12 can be exhibited can be created earlier. With the facts that have just been described above being coupled with each other, the immediate effectiveness in heating in the initial stage of starting up the fuel cell 10 can be increased.

Second Embodiment

While, in the first embodiment, the example of controlling the hot water circuit has been described with an emphasis being put on the importance of the increase in immediate effectiveness in heating in the initial stage of starting up the fuel cell 10, in a second embodiment, warming up of the fuel cell 10 when the temperature is low is attempted to be promoted.

Figure 5:
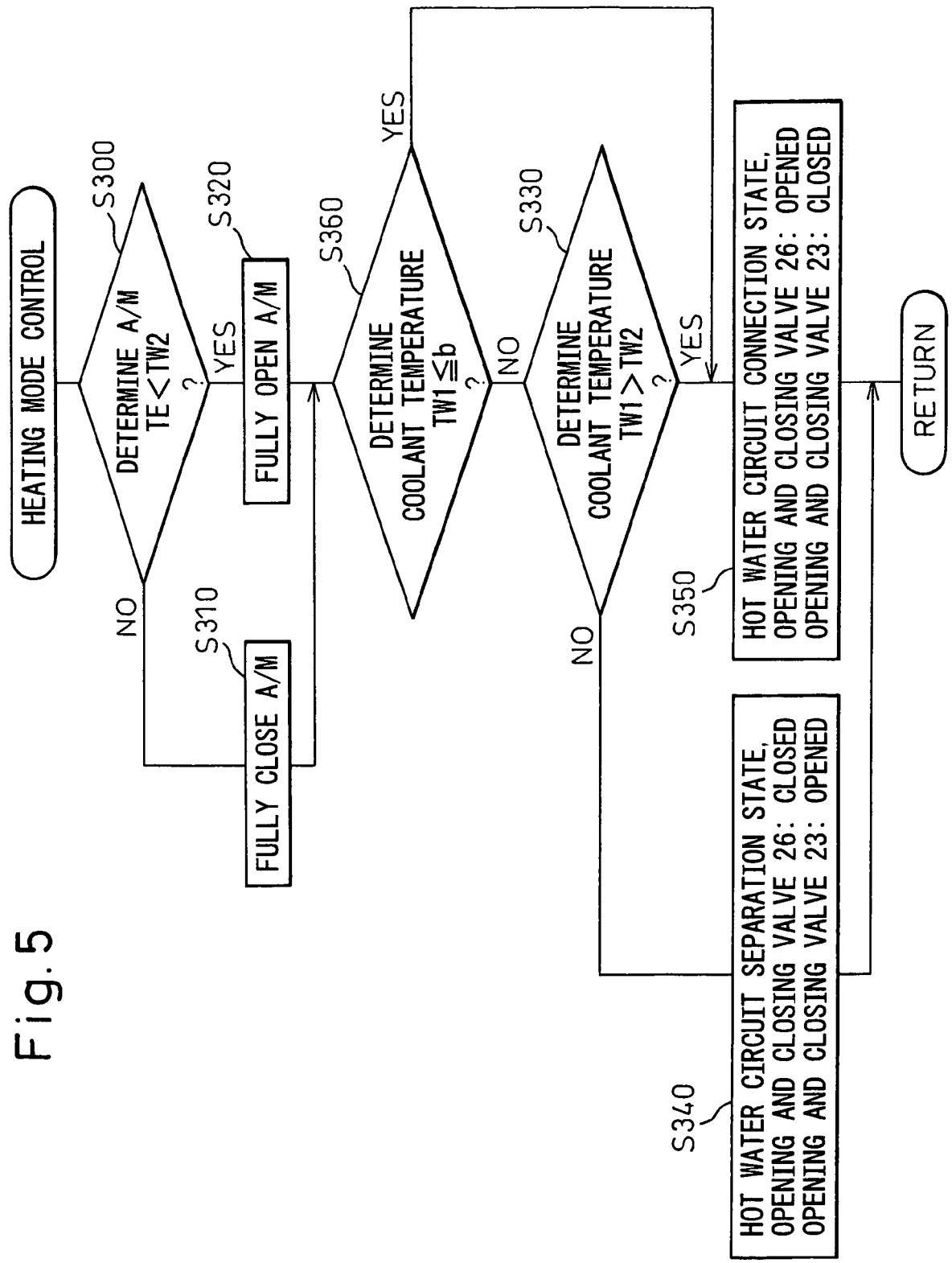
FIG. 5 is a flow chart illustrating a specific example of a heating mode control according to a second embodiment.

FIG. 5 shows a flowchart illustrating an example of controlling the hot water circuit according to the second embodiment, and a determination step is added to that shown in FIG. 4 in which the coolant temperature TW1 on the fuel cell 10 side (the temperature detected by the sensor 41) is determined in step S360. In this determination step S360, whether or not the coolant temperature TW1 on the fuel cell 10 side is equal to or lower than a predetermined low temperature b (for example, 0° C.) which requires warming up to be promoted is determined. Then, if the coolant temperature TW1 on the fuel cell 10 side is equal to or lower than the predetermined low temperature (b), then the process proceeds to step S350, where the opening and closing valve 26 is put in the opened state, whereas the opening and closing valve 23 is put in the closed state, whereby there is set the state in which coolant is circulated between the primary hot water circuit 11 and the secondary hot water circuit 13, that is, the state in which both the hot water circuits 11, 13 are connected to each other.

Consequently, in this connected state, since the coolant flows throughout both the hot water circuits 11, 13, so that the coolant so flowing is then heated by the waste heat from the fuel cell 10 and heat dissipated from the high pressure refrigerant in the coolant-refrigerant heat exchanger 20, the increase in the coolant temperature TW1 on the fuel cell 10 side can be prompted, thereby making it possible to prompt the warming up of the fuel cell 10 when the fuel cell 10 is started up when the temperature is low.

Then, when the coolant temperature TW1 on the fuel cell 10 side becomes higher than the predetermined low temperature (b), then the process proceeds from step S360 to step S330, and thereafter, the same hot water circuit control as that in the first embodiment will be performed.

Third Embodiment

Figure 6:
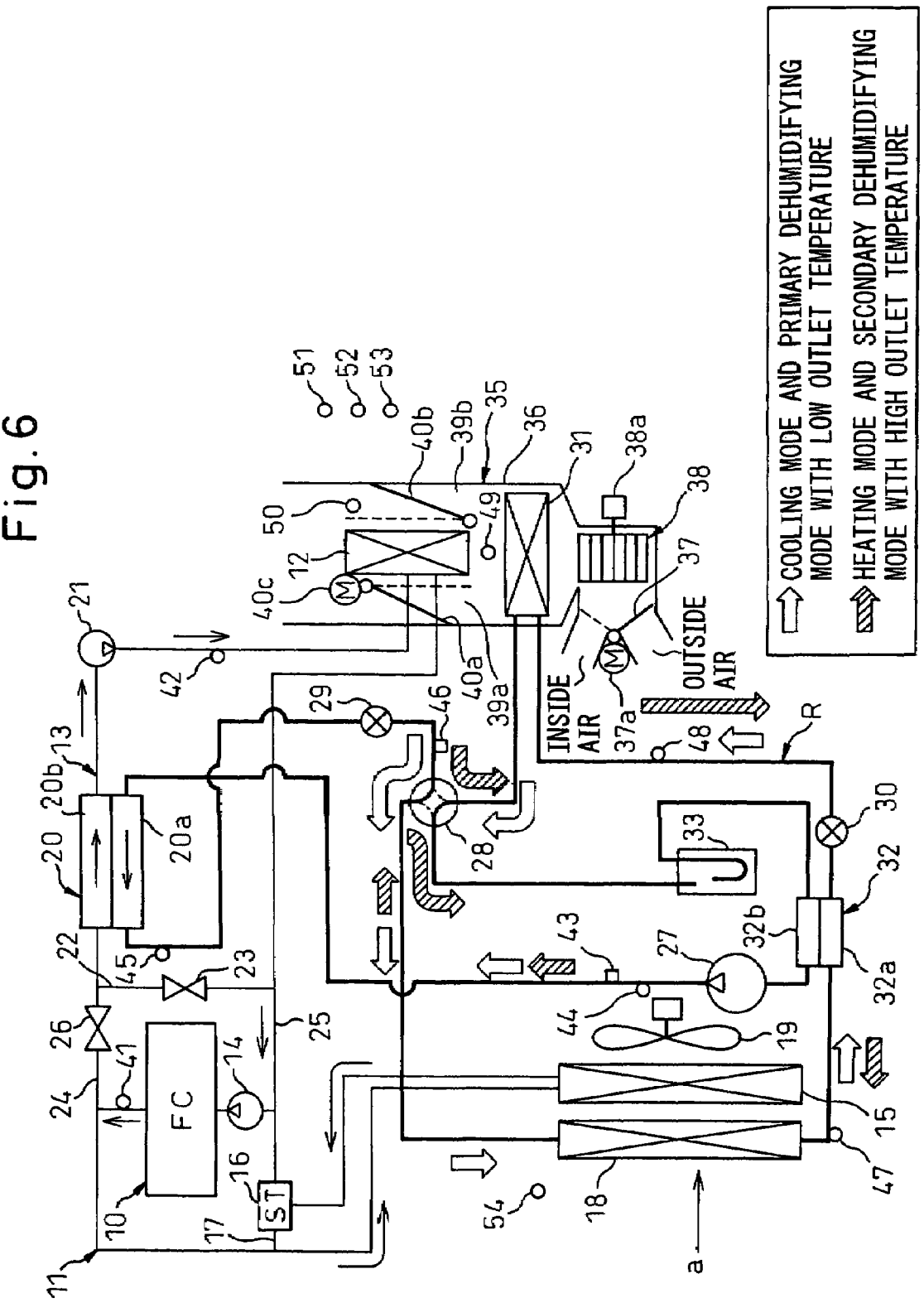
FIG. 6 is an overall system configuration diagram according to a third embodiment of the invention which includes a refrigeration cycle, a hot water circuit and an in-compartment air conditioning unit.

While, in the first embodiment, the coolant-refrigerant heat exchanger 20 in the refrigeration cycle R is connected to the downstream side of the hot water type heater core 12 in the secondary hot water circuit 13, in a third embodiment, as shown in FIG. 6, the coolant-refrigerant heat exchanger 20 in the refrigeration cycle R is connected to the upstream side of the hot water type heater core 12 in the secondary hot water circuit 13.

By adopting this construction, in the third embodiment, hot water heated by the coolant-refrigerant heat exchanger 20 is allowed to flow into the hot water type heater core 12 immediately. Due to this, the heat of high temperature hot water that has been heated in the coolant-refrigerant heat exchanger 20 can be used effectively to heat the interior of the passenger compartment without being dissipated at other locations in a wasteful fashion. As a result, the rise in the heating of the passenger compartment can be promoted further. Note that the other features of the third embodiment are the same as those of the first embodiment.

Fourth Embodiment

Figure 7:
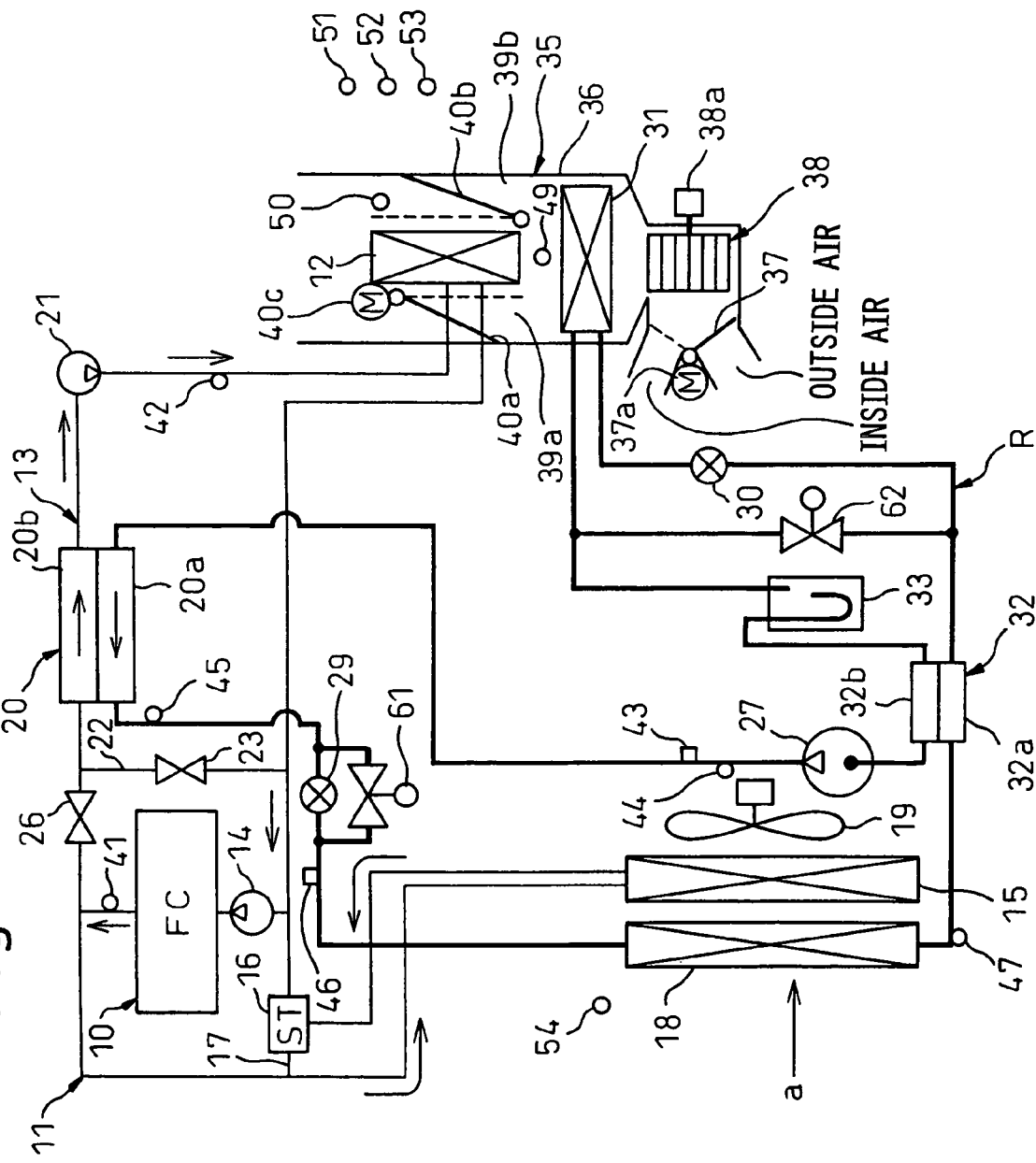
FIG. 7 is an overall system configuration diagram according to a fourth embodiment of the invention which includes a refrigeration cycle, a hot water circuit and an in-compartment air conditioning unit.

While, in the first to third embodiments, the 4-way valve 28 is provided, so that the in-compartment heat exchanger 31 is connected to the downstream side of the refrigerant flow that flows in the coolant-refrigerant heat exchanger 20 by changing over the flow path of the 4-way valve 28 when in the heating mode and the secondary dehumidifying and heating mode with a high outlet temperature, in a fourth embodiment, as shown in FIG. 7, there is provided a configuration in which the 4-way valve 28 is deleted, and the inner heat exchanger 31 is normally connected to the low pressure side of the cycle. Due to this, in the fourth embodiment, the inner heat exchanger 31 is designed not to be connected to the downstream side of the refrigerant flow that flows in the coolant-refrigerant heat exchanger 20 even when in the heating mode and the secondary dehumidifying and heating mode with a high outlet temperature.

To specifically describe features of the fourth embodiment which differ from the other embodiments based on FIG. 7, an outlet side of the high pressure refrigerant passageway 20a of the coolant-refrigerant heat exchanger 20 is connected to a refrigerant inlet side of the outer heat exchanger 18 via a parallel circuit of the primary pressure-reducing device 29 and a primary bypass valve 61.

In addition, a refrigerant outlet side of the inner heat exchanger 31 is directly connected to a refrigerant inlet side of the accumulator 33, and a secondary bypass valve 62 is provided in parallel with a series circuit of the secondary pressure-reducing device 30 and the inner heat exchanger 31. Note that the primary bypass valve 61 and the secondary bypass valve 62 are opening and closing valves which are controlled to be opened and closed by the air conditioning controller 55 (shown in FIG. 2) and can be made up of electromagnetic valves.

In addition, it is similar to the third embodiment in that the coolant-refrigerant heat exchanger 20 of the refrigeration cycle R is connected to the upstream side of the hot water type heater core 12 in the secondary hot water circuit 13.

The other features of the fourth embodiment are the same as those of the first embodiment. Consequently, the primary pressure-reducing device 29 and the secondary pressure-reducing device 30 according to the fourth embodiment are made up of, similarly to the first embodiment, electric expansion valves in which the refrigerant throttle passageway area can be regulated electrically.

Next, the operation of the fourth embodiment will be described. When setting the cooling mode, the primary bypass valve 61 is opened, whereas the secondary bypass valve 62 is closed through the control and output of the air conditioning controller 55. Due to this, in the refrigeration cycle R, refrigerant circulates in a closed circuit which begins from the discharge side of the compressor 27 and terminates at the suction side thereof via the high pressure refrigerant passageway 20a of the coolant-refrigerant heat exchanger 20→the primary bypass valve 61→the outer heat exchanger 18→the high pressure side refrigerant passageway 32a of the internal heat exchanger 32→the secondary pressure-reducing device 30→the inner heat exchanger 31→the accumulator 33→the low pressure side refrigerant passageway 32b of the internal heat exchanger 32.

In this refrigerant flow path, the coolant-refrigerant heat exchanger 20 and the outer heat exchanger 18 function as a high pressure side refrigerant radiator, and on the other hand, the inner heat exchanger 31 functions as a low pressure side refrigerant heat absorber, whereby the inner heat exchanger 30 can function to cool the passenger compartment outlet air so as to cool the interior of the passenger compartment.

Next, when setting the heating mode, the primary bypass valve 61 is closed, whereas the secondary bypass valve 62 is opened through the control and output of the air conditioning controller 55. Due to this, in the refrigeration cycle R, refrigerant circulates in a closed circuit which begins from the discharge side of the compressor 27 and terminates at the suction side thereof via the high pressure refrigerant passageway 20a of the coolant-refrigerant heat exchanger 20→the primary pressure-reducing device 29→the outer heat exchanger 18→the high pressure side refrigerant passageway 32a of the internal heat exchanger 32→the secondary bypass valve 61→the accumulator 33→the low pressure side refrigerant passageway 32b of the internal heat exchanger 32.

In this refrigerant flow path, the coolant-refrigerant heat exchanger 20 functions as a high pressure side refrigerant radiator. On the other hand, the outer heat exchanger 18 functions as a low pressure side refrigerant radiator. In addition, since the inner heat exchanger 31 is short circuited by the secondary bypass valve 62, no refrigerant flow thereinto.

Consequently, all of the heat of refrigerant on the high pressure side of the cycle is dissipated to hot water in the secondary hot water circuit 13 at the coolant-refrigerant heat exchanger 20 so as to heat the hot water. The high temperature hot water so heated circulates to the heater core 12 so that the interior of the passenger compartment can be heated. Note that the opening and closing control of the hot water side opening and closing valves 23, 26 when the fuel cell 10 is started up may be performed in the similar way to that in the first embodiment (FIG. 4) or the second embodiment (FIG. 5).

Next, when setting the dehumidifying and heating mode, both the primary bypass valve 61 and the secondary bypass valve 62 are closed through the control and output of the air conditioning controller 55. Due to this, in the refrigeration cycle R, refrigerant circulates in a closed circuit which begins from the discharge side of the compressor 27 and terminates at the suction side thereof via the high pressure refrigerant passageway 20a of the coolant-refrigerant heat exchanger 20→the primary pressure-reducing device 29→the outer heat exchanger 18→the high pressure side refrigerant passageway 32a of the internal heat exchanger 32→the secondary pressure-reducing device 30→the inner heat exchanger 31→the accumulator 33→the low pressure side refrigerant passageway 32b of the internal heat exchanger 32.

In this refrigerant flow path, the coolant-refrigerant heat exchanger 20 functions as a high pressure side refrigerant radiator. On the other hand, the inner heat exchanger 31 functions as a low pressure side refrigerant radiator. By adopting this construction, low temperature air that has been cooled and dehumidified in the inner heat exchanger 31 is heated again in the heater core 12 so as to dehumidify and heat the interior of the passenger compartment.

When in this dehumidifying and heading mode, when setting the primary dehumidifying and heading mode with a low outlet temperature, through the control and output of the air conditioning controller 55, the throttle passage area of the primary pressure-reducing device 29 is increased so that the pressure loss of the primary pressure-reducing device 29 is reduced, whereas the throttle passage area of the secondary pressure-reducing device 30 is reduced so that the pressure loss of the secondary pressure-reducing device 30 is increased, whereby, since the outer heat exchanger 18 functions as a high pressure side refrigerant radiator, the heat dissipation amount of the coolant-refrigerant heat exchanger 20 is reduced, and the primary dehumidifying and heating mode with a low outlet temperature can be executed.

Contrary to this, when setting the secondary dehumidifying and heading mode with a high outlet temperature, through the control and output of the air conditioning controller 55, the throttle passage area of the primary pressure-reducing device 29 is reduced so that the pressure loss of the primary pressure-reducing device 29 is increased, whereas the throttle passage area of the secondary pressure-reducing device 30 is increased so that the pressure loss of the secondary pressure-reducing device 30 is reduced, whereby since the outer heat exchanger 18 functions as a low pressure side refrigerant radiator, the heat dissipation amount of the coolant-refrigerant heat exchanger 20 is increased, and the secondary dehumidifying and heating mode with a high outlet temperature can be executed.

Other Embodiments

While, in the first to fourth embodiments, both the hot water circuits 11, 13 are separated from each other and the opening and closing valves 23, 26 which open and close the hot water passageways are used as valve devices for implementing the connection therebetween, as this valve device, a flow rate regulating type valve may be used in which the passageway open area of the hot water passageway can be regulated continuously.

Consequently, in the event that this flow rate regulating type valve is used, when setting a connected state between both the hot water circuits 11, 13, for example, a valve corresponding to the opening and closing valve 26 can be set to a state in which the valve is throttled slightly from a fully opened state, whereas a valve corresponding to the opening and closing valve 23 can be set to a state in which the valve is not fully closed but is opened only by a slight opening.

In addition, while, in the first embodiment, the fuel cell 10 is used as the heat generator installed in the vehicle so as to constitute the hot water circuits 11, 13 through which coolant is allowed to circulate, the invention can also equally be applied to a case where instead of the fuel cell 10, driving electric motors of electric vehicles and driving engines of hybrid vehicles are used as the heat generator so as to constitute hot water circuits 11, 13 through which coolant of these heat generators circulates.

In addition, while in the first embodiment, the example is described in which carbon dioxide ($CO_2$) is used as refrigerant and the refrigeration cycle R has the internal heat exchanger 32, the invention can also equally be applied to a case where a normal chlorofluorocarbon system refrigerant and a refrigeration cycle having no internal heat exchanger 32 are used.

Additionally, while in the first, third and fourth embodiments, the bypass passageways 39a, 39b are formed on the sides of the hot water type heater core 12 and the air passageway of the ho water type heater core 12 is opened and closed using the two air mixing doors 40a, 40b which are operated in an interlocking fashion, the invention can also equally be applied to an in-compartment air conditioning unit portion 35 of a type where the bypass passage is formed only one side of the hot water type heater core 12 and the one side, single bypass passageway and the air passageway of the hot water type heater core 12 are opened and closed by a single air mixing door.

In addition, while in the first embodiment, in step S130 in FIG. 3, whether or not the cooling mode switch on the air conditioning control panel 56 is made is determined, and by determining that the cooling mode switch is made, it is determined that a cooling mode command is outputted to the inner heat exchanger 31, this cooling mode switch may be deleted and the requisitions for the cooling mode of the inner heat exchanger 31 may be automatically determined based on the target outlet air temperature TAO, outside air temperature and the like.

While the invention has been described by reference to the specific embodiments chosen for the purposes of illustration, it should be apparent that numerous modifications could be made thereto by those skilled in the art without departing from the basic concept and scope of the invention.

The invention claimed is:

1. An automotive air conditioning system comprising:
a primary hot water circuit which includes a heat generator installed in a vehicle and through which a coolant which cools the heat generator flows;
a secondary hot water circuit which includes a hot water type heater core which heats passenger compartment outlet air and in which the coolant flows through the hot water type heater core;
valve means adapted to be changed over between a cutting off state in which the valve means cut off the primary hot water circuit from the secondary hot water circuit and a connecting state in which the valve means connect the primary hot water circuit with the secondary hot water circuit;
a coolant-refrigerant heat exchanger provided on a discharge side of a compressor along a refrigeration cycle (R) for heating the coolant in the secondary hot water circuit by virtue of heat dissipation from a high-pressure refrigerant on the discharge side of the compressor; and
a primary control means for controlling the valve means by comparing a coolant temperature (TW1) of the primary hot water circuit with a coolant temperature (TW2) of the secondary hot water circuit; wherein
the primary control means controls such that the valve means are put in the cutting off state when the coolant temperature (TW1) of the primary hot water circuit is lower than the coolant temperature (TW2) of the secondary hot water circuit, whereas when the coolant temperature (TW1) of the primary hot water circuit becomes higher than the coolant temperature (TW2) of the secondary hot water circuit, the valve means are put in the connecting state.

2. An automotive air conditioning system as set forth in claim 1, wherein the primary control means sets as a determination temperature a predetermined low temperature at which the warming up of the heat generator is necessary, whereby when the coolant temperature (TW1) of the primary hot water circuit is lower than the predetermined low temperature, the valve means are controlled to be forcibly put in the connecting state.

3. An automotive air conditioning system as set forth in claim 1, wherein the automotive air conditioning system includes further an inner heat exchanger which is connected to a downstream side of a refrigerant flow in the coolant-refrigerant heat exchanger for heating the passenger compartment outlet air by virtue of the heat dissipation from the high-pressure refrigerant when in the heating mode.

4. An automotive air conditioning system as set forth in claim 3, wherein
the inner heat exchanger is disposed on an upstream side of the hot water type heater core in a passageway of passenger compartment outlet air, wherein
bypass passageways which bypass the hot water type heater core and door means which open and close an air passageway of the hot water type heater core and the bypass passageways are disposed in the passageway of passenger compartment outlet air, and wherein
there is provided further a secondary control means for controlling the door means by comparing an air temperature (TE) resulting after the passage through the inner heat exchanger with the coolant temperature (TW2) of the secondary hot water circuit, whereby
when in the heating mode, the secondary control means controls such that the door means are located at positions where the door means fully close the air passageway of the hot water type heater core when the air temperature (TE) resulting after the passage through the inner heat exchanger is higher than the coolant temperature (TW2) of the secondary hot water circuit, whereas when the coolant temperature (TW2) of the secondary hot water circuit is higher than the air temperature (TE) resulting after the passage through the inner heat exchanger, the door means are located at positions where the door means open the air passageway of the hot water type heater core.

5. An automotive air conditioning system as set forth in claim 3, wherein the refrigeration cycle (R) includes the heating mode, a cooling mode which allows the inner heat exchanger to function as a refrigerant heat absorber on a low pressure side thereof and a dehumidifying and heating mode which allows the in-compartment heat exchanger to function as a refrigerant heat absorber on the low pressure side thereof and in which cooling air of the inner heat exchanger is heated by the hot water type heater core in such a manner that the heating mode, the cooling mode and the dehumidifying and heating mode are changed over.

6. An automotive air conditioning system as set forth in claim 1, comprising an inner heat exchanger provided on the low pressure side of the refrigeration cycle (R) for cooling the passenger compartment outlet air by functioning as a refrigerant heat absorber on the low pressure side when in the cooling mode, and wherein
a low-pressure refrigerant of the refrigeration cycle (R) flows while bypassing the inner heat exchanger when in the heating mode.

7. An air conditioning system as set forth in claim 6, wherein
the inner heat exchanger is disposed on an upstream side of the hot water type heater core in a passageway of the passenger compartment outlet air, and wherein
the refrigeration cycle (R) comprises the heating mode, the cooling mode and the dehumidifying and heating mode which allows the inner heat exchanger to function as a refrigerant heat absorber on the low pressure side thereof and in which cooling air of the inner heat exchanger is heated by the hot water type heater core in such a manner that the heating mode, the cooling mode and the dehumidifying and heating mode are changed over.

8. An automotive air conditioning system as set forth in claim 1, wherein the coolant-refrigerant heat exchanger is disposed on the upstream side of the hot water heater core in the secondary hot water circuit.

9. An automotive air conditioning system as set forth in claim 1, wherein refrigerant in the refrigeration cycle (R) is carbon dioxide.

10. An automotive air conditioning system as set forth in claim 1, wherein the heat generator is a fuel cell.

* * * * *